Jan. 20, 1959  J. S. CHANDLER  2,869,381
MULTIPLE CLUTCH DRIVE MECHANISM
Filed July 26, 1957  3 Sheets-Sheet 1
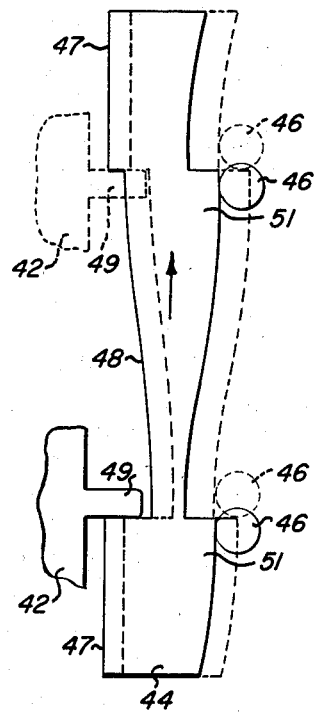
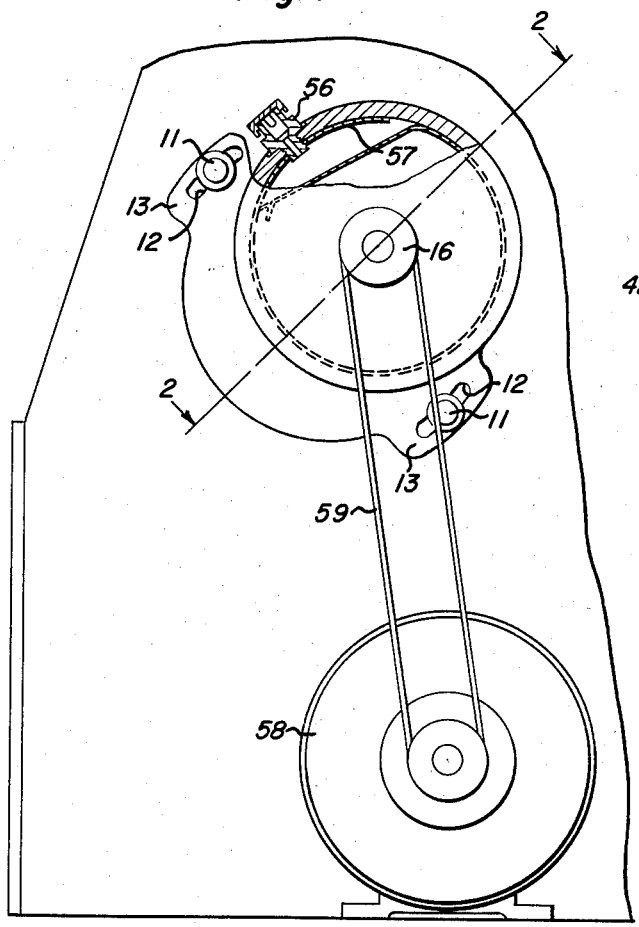
JASPER S. CHANDLER
INVENTOR.
BY R. Frank Smith
Steve W. Gremban
ATTORNEYS Jan. 20, 1959 J. S. CHANDLER 2,869,381
MULTIPLE CLUTCH DRIVE MECHANISM
Filed July 26, 1957 3 Sheets-Sheet 2
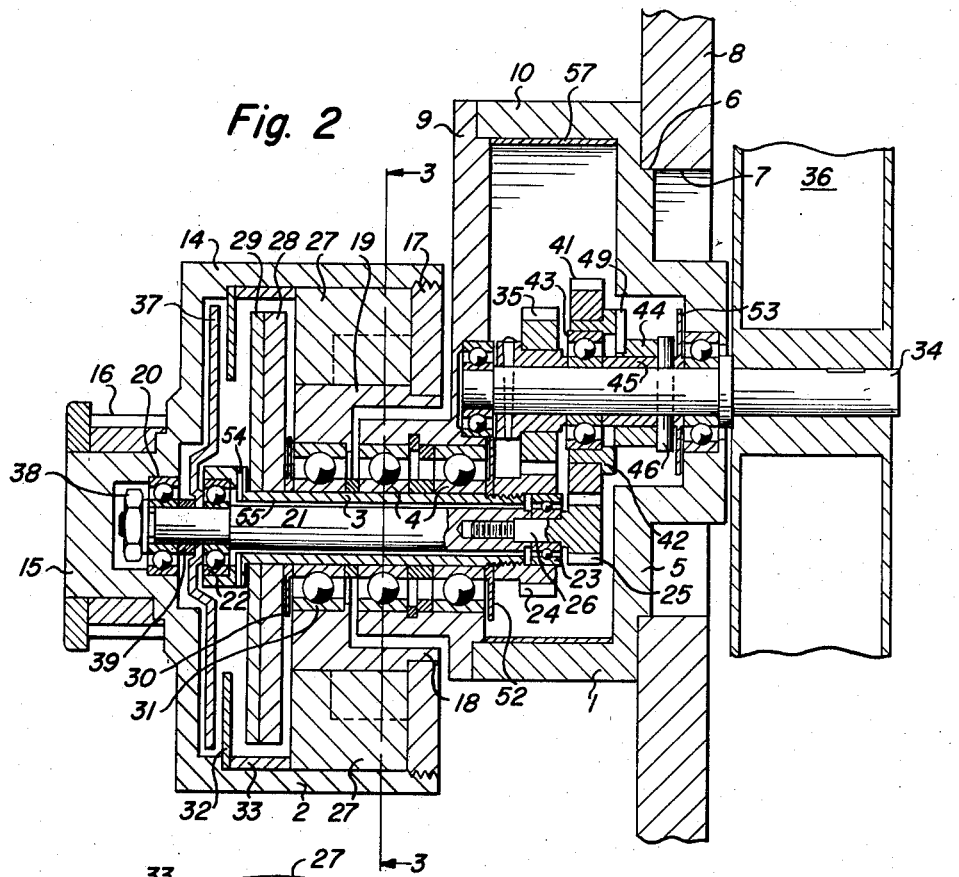
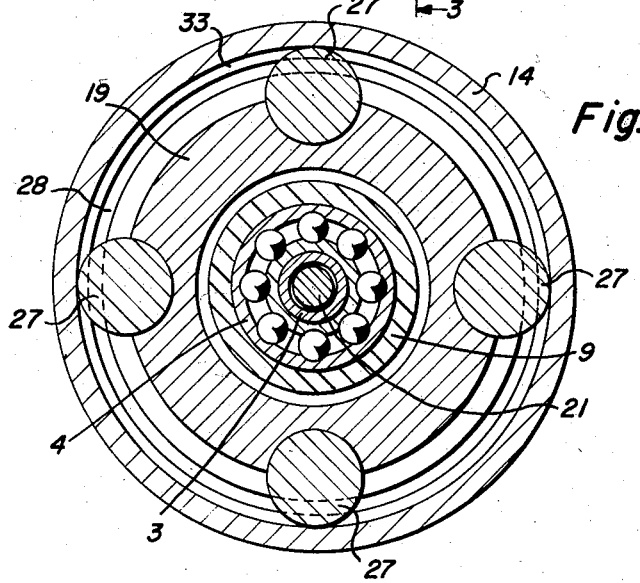
JASPER S. CHANDLER
INVENTOR.
BY
ATTORNEYS Jan. 20, 1959  J. S. CHANDLER  2,869,381
MULTIPLE CLUTCH DRIVE MECHANISM
Filed July 26, 1957  3 Sheets-Sheet 3

JASPER S. CHANDLER
INVENTOR.

BY R. Frank Smith
Steve W. Grembow
ATTORNEYS

United States Patent Office 2,869,381
Patented Jan. 20, 1959

2,869,381

MULTIPLE CLUTCH DRIVE MECHANISM

Jasper S. Chandler, Rochester, N. Y., assignor to Eastman Kodak Company, Rochester, N. Y., a corporation of New Jersey Application July 26, 1957, Serial No. 674,538

9 Claims. (Cl. 74—330)

This invention relates generally to web wind up mechanisms, and more specifically to a multiple clutch wind-up mechanism for web material in which the linear velocity of the web material is maintained substantially constant, and the tension thereof maintained within specified tension limits over a large range of roll diameters.

In web material handling devices of the type having a supply roll and a wind-up roll, means are normally provided for winding the web on the wind-up roll while the web material is being subjected to some type of operation. A perforator is an example of this type of device wherein the film while being transported from the supply roll to the wind-up roll passes through a perforator mechanism that punches out a series of perforations along one or both edges of the film strip. Another device of this general nature is the movie projector in which the film strip while passing from the supply reel to the take-up reel passes through a projector mechanism. Slitters are further examples of this general type of device in which the web material while traveling from a supply roll to a wind-up roll is subjected to the cutting action of rotary knives. In all of the devices indicated, means are provided for rotating the wind-up roll to receive the web material as it leaves the supply roll. Some of the requirements of such a wind-up mechanism are: (1) the tension of the web material wound upon the wind-up roll must be maintained within specified tension limits over the full range of roll diameters; (2) there should not be any sudden changes in web tension or the existence of excessively high or low web tensions momentarily during starting, stopping, as well as at normal speed; (3) the wind-up mechanism must be ruggedly constructed in order to withstand long continuous service without maintenance or adjustment; (4) the wind-up mechanism must be of simple design eliminating the need of control devices operated by film tensions or roll size; and (5) the wind-up spindle must be freely rotatable manually in either direction to facilitate unloading or threading of the device.

The tension to which the web is subjected as it is wound on the wind-up roll is a very important consideration in wind-up mechanisms. For any given application of a wind-up device, it is possible either by tests or past experience to establish web tension limits as indicated by dotted lines in Figs. 7 and 8 as a function of the roll diameter which result in satisfactory performance of the device. Some of the factors considered in the establishment of the tension limits are the required firmness of the wound roll, and the effects of the tension upon material stress, sprocket loading and machine function. If the roll is not wound firmly enough, slippage may occur between adjacent convolutions of film resulting in deterioration of the film through scratching and tearing. On the other hand, excessive tension on the web material results in an excessive stress being imparted thereto causing the material to become deformed. In addition, excessive stress or tension may result in film breakage, and where the film or web is of the type guided by sprockets, excessive wear and damage is suffered by the edges of the film material at the periphery of the sprocket perforations.

Therefore, one of the objects of the present invention is to provide an improved web wind-up mechanism that more nearly accomplishese the foregoing requirements of a web wind-up mechanism than any prior known mechanisms to date.

Another object of this invention is to provide a web wind-up mechanism adapted to maintain the web tension of the material wound on the wind-up roll within a specified limit through a large range of roll diameters.

A further important object of the invention is the provision of an improved web wind-up mechanism that eliminates any sudden changes in web tension during operation, or the momentary existence of excessively high or low tensions during starting and stopping, as well as at normal speed.

One more object of this invention is the provision of an improved web wind-up mechanism of rugged construction adapted to withstand long continuous service without maintenance or adjustment.

Still another object of this invention is to provide a web wind-up mechanism of simple design eliminating the need of control devices operated by film tension or roll size.

Another object of the invention is to provide an improved web wind-up mechanism in which the wind-up spindle is free to be manually rotated in either direction for unloading or threading the device.

Still another object of the invention is the provision of an improved web wind-up mechanism comprising a clutch housing and a gear housing and means interconnecting the housings to provide pressure equalization therebetween.

A more specific object of this invention is the provision of an improved web wind-up mechanism utilizing a combined constant torque and viscous clutch, and having means for coupling another viscous clutch to the output shaft to augment the output of the combined constant torque and viscous clutch.

Objects and advantages other than those set forth above will be apparent from the following description when read in connection with the accompanying drawing, in which:

Fig. 1 is a fragmentary elevation view partially in section of a web wind-up mechanism embodying the invention;

Fig. 2 is an enlarged section view taken along line 2—2 of Fig. 1;

Fig. 3 is a view in section taken along line 3—3 of Fig. 2;

Fig. 4 is a view of the ring-shaped overrunning clutch represented as being opened out and lying in a plane with all rotational motions represented by linear motions;

Figure 5:
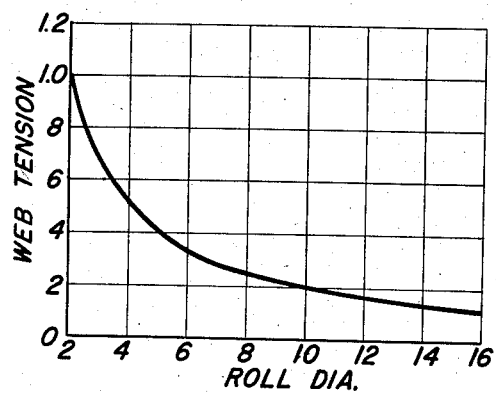
Fig. 5 shows a web tension-roll diameter characteristic curve for a constant torque clutch.

Before describing the web wind-up mechanism as shown in the drawings in detail, the general theory of operation of the mechanism will be discussed. The web wind-up mechanism of this invention comprises essentially a combined constant torque and viscous clutch with means for augmenting the output of this clutch by another viscous clutch at a predetermined time. By means of a stable constant torque clutch such as a friction clutch or a hysteresis clutch, essentially constant torque which is uneffected by the angular velocity of the clutch shaft can be delivered. The relationship of the torque ($T_1$) of a constant torque clutch to the web tension ($F_1$) and roll diameter ($d$) is as follows:

$$T_1 = F_1\left(\frac{d}{2}\right) = \text{constant}$$

It is obvious from an appraisal of this formula that the web tension of a web wound up by a constant torque clutch would be either too high at small roll diameters or too low at large diameters, or both. The relationship of the web tension to the roll diameter for a constant torque clutch is shown graphically in Fig. 5.

It is generally known that a viscous clutch of the type utilizing the sheer stress of an oil layer delivers a torque that is essentially proportional to the angular rate of slip of the clutch parts. Clutches which employ the generation of eddy currents in conducting materials are also of this type. The angular rate of slip may be defined as the relative difference in angular velocity between the clutch disk and the housing enclosing the disk at any particular instance. If the web material is to be wound upon the roll at a substantially constant linear velocity, the angular velocity (R. P. M.) of the roll when full must be less than when the roll is empty, the rate of rotation being expressed by the formula:

$$\text{R. P. M.} = \frac{S}{\pi d}$$

where $S$=linear velocity of the film and $d$ is equal to the outside diameter of the film on the roll. Therefore, the ratio:

$$\frac{\text{R. P. M. (full)}}{\text{R. P. M. (empty)}} = \frac{S/d \text{ (full)}}{S/d \text{ (empty)}} = \frac{d \text{ (empty)}}{d \text{ (full)}}$$

shows that the angular velocity of the wind-up roll is inversely proportional to the diameter of the wound film on the roll. In other words, the roll when full must rotate proportionally more slowly than when empty in order to receive film traveling at a substantially constant linear velocity. Since the angular rate of slip is related to the angular velocity, the formula for the torque $T_2$ for a viscous clutch is as follows:

$$T_2 = K\left(\frac{1}{d_0} - \frac{1}{d}\right)$$

Where $K$ is a constant depending on the torque coupling, gear ratios and actual linear velocity of the web and $d_0$ is the roll diameter corresponding to zero slip of the viscous clutch. Then:

$$F_2 = \frac{2T_2}{d} = \frac{2K}{d}\left(\frac{1}{d_0} - \frac{1}{d}\right)$$

This equation shows that the film tension produced by the viscous type of clutch changes from 0 at $d=d_0$ to a maximum of $K/2d_0^2$ at $d=2d_0$ and then trails off to zero at infinite diameter. The stall torque delivered by such a device is just double that delivered at $d=2d_0$, which is the position of maximum web tension. The tension curve is shown by Fig. 6 for the case of $d_0=2$ and $F_2$ max=1. We see that while the tension does not decay as rapidly after the maximum is reached as it does in Fig. 5, the starting tension is entirely inadequate. This could be remedied by making $d_0$ smaller, say $d_0=1$ such that maximum tension occurs at $d=2$, but then the end tension drops still lower, the efficiency is greatly reduced, and the starting tension would still be inadequate during the period of bringing the machine up to speed since the clutch torque is subnormal at reduced input speed.

Figure 6:
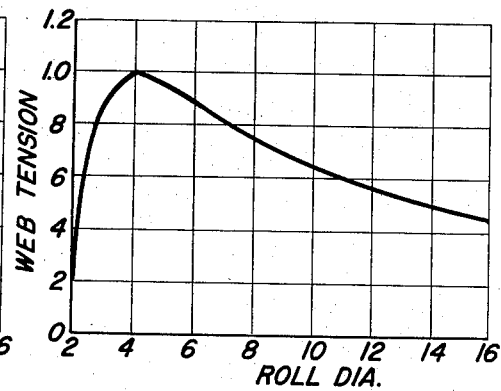
Fig. 6 is a view similar to Fig. 5 showing the characteristic curve for a viscous clutch.
Figure 7:
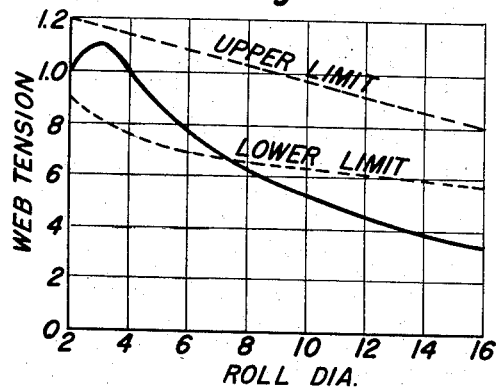
Fig. 7 is a web tension-roll diameter graph showing a characteristic curve of a combined constant torque and viscous clutch.
Figure 8:
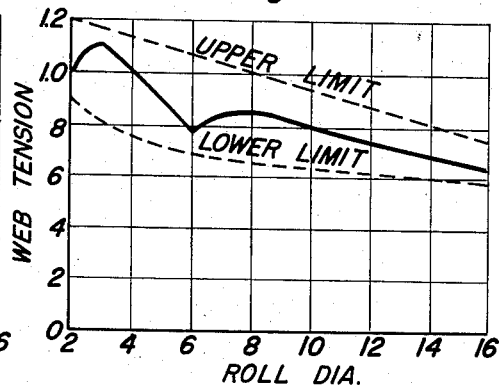
Fig. 8 is a web tension-roll diameter graph showing the characteristic curve of the web wind-up mechanism embodying this invention.

Since the starting situation is good for the constant torque clutch of Fig. 5 (even for subnormal speeds during start-up), a combination of the constant torque and viscous clutches is believed to be advantageous. In Fig. 7, the tension $F_1$ of Fig. 5 has been augmented by the addition of 50 percent of the tension $F_2$ of Fig. 6. The tension characteristic is now acceptable at the start and to a roll diameter in excess of 6. Now a second clutch member of the viscous (or eddy current) type may be allowed to come into action by means of an overrunning clutch connection. If this clutch has a drive ratio such as to make its $d_0$ equal to approximately 6 and its maximum tension contribution (at $d=12$) equal to approximately 0.3, the resulting over-all tension curve is shown by Fig. 8. Thus the desired tension requirements have been satisfied for a roll diameter ratio of 9:1 or more. No sudden change in tension occurs at the junction of curve sections because the last clutch engages at the roll diameter at which its torque delivery is essentially zero. It is noted from a study of the characteristic curve that the correct torque is automatically delivered at each roll size as the wind-up velocity becomes progressively slower and without the aid of regulating devices controlled by feed back from a tension measuring or roll size sensing means. It is also noted that the over-all efficiency of operation is greater with part of the torque derived from a lower speed element than is the case for one high-speed input. In like manner, additional viscous clutches can be added if desired for extended diameter ratios or at closer intervals to meet tighter tension limit tolerances.

As seen in Fig. 2, the web wind-up mechanism of this invention comprises essentially a stationary gear housing 1 and a clutch housing 2 rotatably mounted in part on a sleeve 3 journalled in bearings 4 carried by the gear housing 1. The gear housing 1 has a circular, stepped base member 5 provided with a circular shoulder 6 adapted to be received by a corresponding opening 7 formed by the frame 8 of a perforator or similar device. A substantially circular cover plate 9 has a peripheral seat for receiving an annular projection 10 formed by the base member 5. The base member 5 and cover plate 9 are secured together to form the gear housing 1 and the entire mechanism is secured to the frame 8 by means of studs 11 mounted on the frame 8 and extending through arcuate slots 12 formed by projecting flanges 13 of the cover plate 9 as seen in Fig. 1.

The clutch housing 2 includes a circular, cup shaped member 14 having a central projection 15 for receiving a pulley 16 pressed thereon. The member 14 is closed off at its open end by an annular steel cover disk 17 having a threaded periphery adapted to engage complementary threads on the member 14. The inner circular edge of the cover disk 17 is pressed onto a seat 18 formed by an annular magnet support block 19 to secure the member 14 and block 19 together. The support block 19 is rotatably mounted on a bearing 31 carried by the sleeve 3, and through its connection with the cover disk 17 rotatably supports one end of the clutch housing 2 on the sleeve 3. The opposite end of the housing 2 is rotatably supported by a bearing 20 disposed within a stepped bore formed by the projection 15 and mounted on a shaft 21 coaxial with and extending through the sleeve 3 and rotatably supported thereby. The shaft 21 has one end journalled in a bearing 22 carried by one end of the sleeve 3 and the opposite end of the shaft 21 supported by a bearing 23 carried by a gear 24 threaded onto the opposite end of the sleeve 3. A gear 25 has an axial projection passing through the bearing 23 with a portion thereof forming a journal 26 for the bearing and the end of the projection threaded into a central bore formed by the shaft 21 to secure the gear 25 thereto.

The constant torque clutch is of the permanent magnet hysteresis type and comprises a plurality of cylindrical magnets 27 disposed in arcuate slots formed by the magnet support block 19 as shown in Figure 3 and retained in the slots by the inner periphery of the member 14. An annular hysteresis disk 28 of permanent magnet material which is not premagnetized and an annular soft steel back-up plate 29 are rigidly secured to sleeve 3 by the clamping action of gear 24 threaded on sleeve 3. The magnetic flux path of this clutch is through the magnets 27, back-up plate 29 and cover disk 17 back to the magnets. A spacer element 30 is interposed between the bearing 31 and the disk 28 to control the length of the magnetic gap between the magnets 27 and the disk 28. Adjusting the length of the magnetic gap changes the value of the resisting torque resulting from the resistance to rotation of the disk 28 relative to the permanent magnets 27. The resistance to rotation of the disk 28 is caused by the hysteresis effect as the disk particles alternately move past north and south poles of the magnets 27. The spacer 30 further acts as a slinger to prevent fluid from leaking out of the housing 2 through the bearing 31.

To provide a viscous clutch, an annular baffle 32 is disposed on a circular seat formed by the member 14 and is held in position by a sleeve 33 interposed between the baffle 32 and the magnets 27. When the cover disk 17 is threaded onto the member 14, the magnets 27 bear against the sleeve 33 which in turn holds the baffle 32 in place. Since the magnets 27 bear against the sleeve 33, the position of the magnets 27 are fixed so that the only control of the magnetic gap is by the spacer element 30. The cavity formed by the housing 2 is partially filled with a suitable viscous medium such as a silicone oil to a controlled level. As the housing 2 is rotated, the oil is thrown to the periphery of the cavity by centrifugal force. As a result, the two disks 28, 29 are viscously coupled to the housing 2 by the oil layers existing between the disks 28, 29 and the baffle 32, sleeve 33, and magnets 27. The torque developed by this viscous coupling is transmitted by the disks 28, 29, sleeve 3, and gear 24 to an output shaft 34 through a gear 35 pinned thereto. The output shaft 34 is journalled in bearings centrally carried by the cover plate 9 and member 5 of the gear housing 1. A wind-up reel 36 is mounted on the shaft 34.

Another thin circular disk 37 is disposed on the shaft 21 between the bearings 20 and 22 and is secured thereto by means of a nut 38 on the end of the shaft 21 adapted to clamp the disk 37 between the inner races of the bearings. A spacer element 39 permits axial adjustment of the disk 37 on the shaft 21. The periphery of the disk 37 extends into a cavity formed by the baffle 32 and a part of the member 14, and is viscously coupled thereto by the oil film existing therebetween. The torque resulting from this viscous coupling is transmitted by the disk 37, shaft 21, and gear 25 to a gear 41 press-fitted on a hub member 42 rotatably mounted on a bearing 43 carried by the output shaft 34. The gear 41 and hub member 42 rotate on the bearing 43 independently of the output shaft 34, which during the initial winding of the web is rotating faster than the gear 41, until the shaft 34 is slowed down to an angular velocity equal to the freewheeling angular velocity of the gear 41. When this occurs, the torque developed by the disk 37 is added to or augments the torque provided to the shaft 34 by the disks 28, 29. The coupling between the hub member 42 and shaft 34 is accomplished by an overrunning clutch mechanism. The overrunning clutch mechanism as shown in Figs. 2 and 4 comprises a ring 44 rotatably mounted on a sleeve 45 keyed to the shaft 34 by a pin 46. One edge 47 of the ring 44 is provided with an inclined notch 48 into which a lug 49 carried by the hub member 42 extends. The opposite edge of the ring 44 is provided with a plurality of sawtooth members 51 adapted to cooperate with the protruding ends of the pin 46. During the initial winding of a roll of web material on the reel 36, the shaft 34 and pin 46 move at a greater angular velocity than the hub member 42 and ring 44. Accordingly, the ring 44 is urged laterally to the left with respect to the hub member 42 as shown in full lines in Fig. 4 allowing free passage of the ends of the pin 46 to the right of the sawtooth members 51. When the roll diameter has increased to the point where the angular velocity of the output shaft 34 has slowed down and begins to drop behind that of the hub member 42, the ring 44 slows down as a result of the friction existing between it and the sleeve 45. Since the hub member 42 is now moving faster than the ring 44, the lug 49 rides up the inclined notch 48 and cams the ring 44 laterally to the right causing the sawtooth members 51 to engage the ends of the pin 46 as shown dotted in Fig. 4. This drivingly engages the hub member 42 with the output shaft 34 and slows down with the shaft 34 continuing to transmit increasing amounts of torque thereto as the disk 37 is slowed down.

The relative viscous coupling constants of the viscous clutch disks 28, 29 and viscous clutch disk 37 is controlled by the positioning of the baffle 32 therebetween. Placing the baffle 32 closer to one of the viscous clutch disks increases the value of the coupling constant for that clutch while reducing the value of the other clutch constant. The absolute coupling constant of both clutches is determined and controlled by the choice of oil viscosity and the amount of oil in the clutch housing 2.

The gear housing 1 is provided with a suitable amount of oil to provide gear lubrication. Oil slinger 52 is provided on the sleeve 3 and the sleeve 45 forms an oil slinger 53 to prevent oil from leaking out of the housing 1 through the bearings. Since a reduced pressure area is developed within the clutch housing 2 during operation as a result of the centrifugal force imparted to the oil and a slightly higher than atmospheric pressure developed therein after the clutch housing 2 is stopped, pressure equalization means are provided to equalize the pressure in the clutch and gear housings 2, 1. The pressure equalization means comprises radial openings 54 in the sleeve 3 connecting the cavity formed by the clutch housing 2 to the annular space 55 defined by the shaft 21 and the sleeve 3 to form a passageway connecting the clutch and gear housings 2, 1, respectively. The gear housing 1 is further provided with an air vent 56 as seen in Fig. 1 to allow for any "breathing" action which may be required by pressure changes in the housings 1, 2. A circular baffle 57 is mounted in the gear housing to prevent the discharge of oil through the air vent 56 resulting when the pressure above atmosphere within the housings 1, 2 is released to atmosphere.

In the operation of this invention, a constant speed motor 58 of any known type is connected by suitable means such as a Gilmer belt 59 to the pulley 16 to rotate the clutch housing 2 at a constant angular velocity. The torque developed by the disks 28, 29 as a result of the hysteresis effect produced by the magnets 27 and the viscous coupling produced by the oil layers is transmitted through the sleeve 3 and gears 24, 35 to the output shaft 34. The torque produced by the viscous coupling of the disk 37 is transmitted through the shaft 21 and gears 25, 41 to the hub member 42 which rotates about the shaft 34 at a slower angular velocity than the shaft 34. The overrunning clutch ring 44 is cammed out of engagement with the pin 46 so that the hub member 42 is not mechanically connected to the output shaft 34. This condition exists until the roll diameter of the wound web material on the output shaft 34 has increased to the point where the angular velocity of the shaft 34 drops below that of the hub member 42. At this point, the overrunning clutch engagement mechanism mechanically connects the hub member 42 to the output shaft 34 so that the torque produced by the disk 37 is transmitted to the output shaft 34 to augment the torque provided thereto by the disks 28, 29.

Although but one embodiment has been illustrated and described, it will be apparent to those skilled in the art that various changes and modifications may be made therein without departing from the spirit of the invention or from the scope of the appended claims.

I claim:

1. In a web wind-up mechanism, the combination of:

a stationary member; a sleeve rotatably supported by said member; a first disk secured to said sleeve; a rotatable housing enclosing said disk and adapted to be rotated at a substantially constant angular velocity; an annular baffle mounted within said housing to form adjacent cavities containing oil, said first disk extending into one of said cavities to develop a torque upon rotation of said housing; a permanent magnet carried by said housing and adapted to cooperate with said first disk to develop additional torque resulting from the magnetic coupling therebetween; a spindle coaxial with and rotatably supported by said sleeve; a second disk secured to said spindle and extending into the other of said cavities to develop a torque upon rotation of said housing; and means for connecting said spindle to said sleeve when the angular velocity of said sleeve falls below a predetermined value whereby the torque developed by said second disk is added to the torque developed by said first disk.

2. The invention as defined in claim 1 wherein said stationary member comprises a gear housing rotatably supporting an output shaft, and bearing means carried by said housing for rotatably supporting said sleeve parallel to said output shaft.

3. The invention as defined in claim 2 wherein gear means are provided to connect said sleeve to said output shaft, and an overrunning clutch connects said spindle supported by said sleeve to said output shaft.

4. The invention as defined in claim 2 wherein said spindle and said sleeve form a passageway connecting said rotatable housing to said gear housing to provide pressure equalization therebetween, and said gear housing is provided with an air vent to atmosphere.

5. The invention as defined in claim 1 wherein said rotatable housing comprises a circular cup-shaped member rotatably mounted on said spindle, an annular support block rotatably mounted on said sleeve, and an annular disk connecting said member to said support block to form a clutch enclosure.

6. The invention as defined in claim 1 wherein said last recited means comprises an output shaft, gear means connecting said sleeve to said output shaft, and gear means including an overrunning clutch for connecting said spindle to said output shaft.

7. In a web wind-up mechanism, the combination of: a stationary gear housing; an output shaft carried by said gear housing and extending through one side thereof; a sleeve rotatably supported by the other side of said gear housing parallel to and offset from said output shaft; an annular support block rotatably mounted on said sleeve; a spindle extending through said sleeve coaxial therewith and rotatably supported thereby; a circular, cup shaped member rotatably mounted on said spindle, said member having a central projection for receiving a pulley adapted to be rotated at a substantially constant angular velocity; an annular cover plate connecting said member to said support block to form a clutch housing; an annular baffle mounted within said clutch housing to form adjacent cavities containing oil; a permanent magnet carried by said support block; a first disk secured to said sleeve and having its periphery extending into one of said cavities to develop a torque upon rotation of said clutch housing, said first disk further disposed in facing relationship with said magnet and cooperating therewith to develop additional torque resulting from the magnetic coupling therebetween; a second disk secured to said spindle and having its periphery extending into the other of said cavities to develop a torque upon rotation of said clutch housing; gear means disposed in said gear housing for connecting said sleeve to said output shaft to transfer the torque developed by said first disk thereto; and gear means including an overrunning clutch for connecting said spindle to said output shaft when the angular velocity of said output shaft falls below the angular velocity of said overrunning clutch whereby the torque developed by said second disk is added to the torque developed by said first disk.

8. The invention as defined in claim 7 wherein said spindle and said sleeve form a passageway connecting the cavities of said clutch housing to said gear housing to provide pressure equalization therebetween, said gear housing being provided with an air vent to atmosphere.

9. The invention as defined in claim 8 wherein said gear housing is provided with an annular baffle to prevent lubricating oil in said gear housing from escaping through said air vent.

References Cited in the file of this patent

UNITED STATES PATENTS 2,796,222    Frankel _____ June 18, 1957